(12) United States Patent
Kura et al.

(10) Patent No.: US 6,839,622 B2
(45) Date of Patent: Jan. 4, 2005

(54) VEHICLE CONTROL SYSTEM

(75) Inventors: Kaname Kura, Kariya (JP); Kuraji Katoh, Chita-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/669,598

(22) Filed: Sep. 25, 2003

(65) Prior Publication Data

US 2004/0078135 A1 Apr. 22, 2004

(30) Foreign Application Priority Data

Oct. 16, 2002 (JP) .......................................... 2002-301341
Aug. 29, 2003 (JP) .......................................... 2003-307287

(51) Int. Cl.$^7$ .............................................. G06F 19/00
(52) U.S. Cl. ..................................... 701/114; 701/115
(58) Field of Search ................................. 701/101, 102, 701/104, 114, 115

(56) References Cited

U.S. PATENT DOCUMENTS 5,884,211 A * 3/1999 Pauli et al. ................. 701/115
5,999,876 A * 12/1999 Irons et al. ................. 701/115
6,538,559 B1 * 3/2003 Okada ........................ 340/5.72
2001/0021893 A1 * 9/2001 Weisman, II ............... 701/114
2002/0032891 A1 * 3/2002 Yada et al. .................. 714/766
2004/0080997 A1 * 4/2004 Okada et al. ................ 365/200

FOREIGN PATENT DOCUMENTS

| JP | B2-5-52000 | 12/1993 |
| JP | 7-287604 | 10/1995 |
| JP | 9-120376 | 5/1997 |
| JP | 10-228787 | 8/1998 |

* cited by examiner

Primary Examiner—John T. Kwon
(74) Attorney, Agent, or Firm—Nixon & Vanderhye P.C.

(57) ABSTRACT

A storing area of a non-volatile memory includes a plurality of blocks, in each of which a failure diagnosis frequency (numerator) and an operating frequency (denominator) are stored. The failure diagnosis frequency is the number of times failure diagnosis is executed, while the operating frequency is the number of times a vehicle enters a given operating state. When the vehicle enters the given operating state or the failure diagnosis is executed, rewriting is executed as incrementing, by one, the stored failure diagnosis frequency or operating frequency in a given block. When the operating frequency in the given block reaches an overflow threshold, the failure diagnosis frequency and operating frequency are reduced to half and written in a different block.

16 Claims, 9 Drawing Sheets

|    | DIAGNOSIS FREQUENCY (NUMERATOR) | OPERATING FREQUENCY (DENOMINATOR) |
|----|---------|---------|
| B1 | $C000   | $FFFD   |
| B2 | $0000   | $0000   |
| B3 | $0000   | $0000   |
| B4 | $0000   | $0000   |
| B5 | $0000   | $0000   |

FIG. 5A
| | NUMERATOR | DENOMINATOR |
|---|---|---|
| B1 | $C000 | $FFFD |
| B2 | $0000 | $0000 |
| B3 | $0000 | $0000 |
| B4 | $0000 | $0000 |
| B5 | $0000 | $0000 |
FIG. 5B
| | NUMERATOR | DENOMINATOR |
|---|---|---|
| B1 | $C000 | $FFFE |
| B2 | $0000 | $0000 |
| B3 | $0000 | $0000 |
| B4 | $0000 | $0000 |
| B5 | $0000 | $0000 |
FIG. 5C
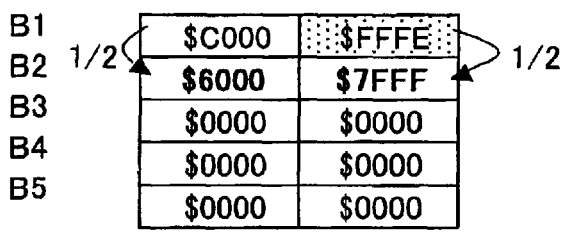
| | NUMERATOR | DENOMINATOR |
|---|---|---|
| B1 | $C000 | $FFFE |
| B2 | $6000 | $7FFF |
| B3 | $0000 | $0000 |
| B4 | $0000 | $0000 |
| B5 | $0000 | $0000 |
FIG. 6A
| | NUMERATOR | DENOMINATOR |
|---|---|---|
| B1 | $C000 | $FFFE |
| B2 | $FFFD | $F000 |
| B3 | $0000 | $0000 |
| B4 | $0000 | $0000 |
| B5 | $0000 | $0000 |
FIG. 6B
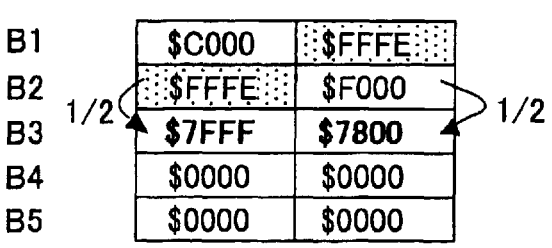
| | NUMERATOR | DENOMINATOR |
|---|---|---|
| B1 | $C000 | $FFFE |
| B2 | $FFFE | $F000 |
| B3 | $7FFF | $7800 |
| B4 | $0000 | $0000 |
| B5 | $0000 | $0000 |

|    | NUMERATOR | DENOMINATOR |
|----|-----------|-------------|
| B1 | $FFFF (USED) | $FFFE |
| B2 | $6000 | $7FFF |
| B3 | $0000 | $0000 |
| B4 | $0000 | $0000 |
| B5 | $0000 | $0000 |

FIG. 12A

| | NUMERATOR | DENOMINATOR |
|---|---|---|
| B1 | $C000 | $FFFD |
| B2 | $0000 | $0000 |
| B3 | $0000 | $0000 |
| B4 | $0000 | $0000 |
| B5 | $0000 | $0000 |

FIG. 12B

| | NUMERATOR | DENOMINATOR |
|---|---|---|
| B1 | $C000 | $FFFE |
| B2 | $0000 | $0000 |
| B3 | $0000 | $0000 |
| B4 | $0000 | $0000 |
| B5 | $0000 | $0000 |

FIG. 12C

| | NUMERATOR | DENOMINATOR |
|---|---|---|
| B1 | $C000 | $FFFE |
| B2 | $0000 | $0001 |
| B3 | $0000 | $0000 |
| B4 | $0000 | $0000 |
| B5 | $0000 | $0000 |

FIG. 13A

| | NUMERATOR | DENOMINATOR |
|---|---|---|
| B1 | $C000 | $FFFE |
| B2 | $FFFD | $F000 |
| B3 | $0000 | $0000 |
| B4 | $0000 | $0000 |
| B5 | $0000 | $0000 |

FIG. 13B

| | NUMERATOR | DENOMINATOR |
|---|---|---|
| B1 | $C000 | $FFFE |
| B2 | $FFFE | $F000 |
| B3 | $0000 | $0000 |
| B4 | $0000 | $0000 |
| B5 | $0000 | $0000 |

FIG. 13C

| | NUMERATOR | DENOMINATOR |
|---|---|---|
| B1 | $C000 | $FFFE |
| B2 | $FFFE | $F000 |
| B3 | $0001 | $0000 |
| B4 | $0000 | $0000 |
| B5 | $0000 | $0000 |

VEHICLE CONTROL SYSTEM

CROSS REFERENCE TO RELATED APPLICATIONS

This application is based on and incorporates herein by reference Japanese Patent Applications No. 2002-301341 filed on Oct. 16, 2002 and No. 2003-307287 filed on Aug. 29, 2003.

FIELD OF THE INVENTION

The present invention relates to a vehicle control system that has a function of self-diagnosis and storing the number of self-diagnosis times in a non-volatile memory.

BACKGROUND OF THE INVENTION

Rate Base Monitor Method in OBD II (On Board Diagnosis Version II) revised in 2002 will be applied to a vehicle of a model year of 2005. According to Rate Base Monitor Method, a frequency ratio of failure diagnosis that an engine ECU conducts on an $O_2$ sensor or the like is required to be not less than a given value. In detail, the frequency ratio is defined as a fractional number (=(numerator)/(denominator)), while the number of times of failure diagnosis (failure diagnosis frequency) and the number of times of vehicle's operating state (operating frequency) are defined as a numerator and a denominator, respectively. Furthermore, it is required that the failure diagnosis frequency and the operating frequency be stored in a non-volatile memory for the frequency ratio of the failure diagnosis to be able to be practically confirmed. Here, for preventing overflow in the non-volatile memory, when either the failure diagnosis frequency or the operating frequency reaches $65535\pm2(=(2^{16}-1)\pm2)$, values of the stored failure diagnosis frequency and operating frequency are reduced to half. This is specified by a regulation.

On the other hand, in an EEPROM (Electrically Erasable Programmable and Read Only Memory) as the non-volatile memory, stored contents are erased or written by injecting or extracting electron via tunnel oxide film to/from a floating gate. Here, the electron motion develops stress and damage in the tunnel oxide film, so that the rewriting frequency must be limited to be under operation guarantee frequency (e.g., 100,000 times).

Thus, the non-volatile memory must be used under a condition where the rewriting frequency is less than the operation guarantee frequency. JP-B2-H5-52000 therefore discloses memory designing. Here, a storing area of an EEPROM is divided into plural blocks, each of which is provided with a storing portion for the rewriting frequency in the block as a counter value. When it is determined, with the counter value, that the rewriting frequency of a certain block being a present storing block reaches a given value less than the operation guarantee frequency, the present storing block is switched from the certain block to another block.

However, this memory designing involves increase of required memory volume in the non-volatile memory due to providing the storing portion for the rewriting frequency in each block.

SUMMARY OF THE INVENTION

It is an object of the present invention to provide a vehicle control system capable of restricting a rewriting frequency of a non-volatile memory to being less than an operation guarantee frequency without increasing required memory volume for storing a failure diagnosis frequency and a vehicle's operation frequency.

To achieve the above object, a control system controlling an in-vehicle device in a vehicle is provided with the following. It is detected that the vehicle enters an operating state. A failure diagnosis is executed on a diagnosis target when a given condition is effected. A non-volatile memory being electrically rewritable is provided for including a plurality of blocks that can be stored with frequency information including an operating frequency that is a number of times the vehicle enters the operating state and a failure diagnosis frequency that is a number of times the failure diagnosis is executed. Execution information relating to the frequency information is outputted when it is externally requested that information regarding an execution frequency ratio of the failure diagnosis be outputted. The frequency information included in a rewriting target block of the blocks is rewritten. An operating frequency included in the rewriting target block is increased when it is detected that the vehicle enters the operating state, while a failure diagnosis frequency included in the rewriting target block is increased when the failure diagnosis is executed. The rewriting target block is switched from a given block of the blocks to a certain block of the blocks, when at least one of a given operating frequency and a given failure diagnosis frequency in the given block reaches an overflow threshold. Here, half of the given operating frequency and half of the given failure diagnosis frequency are written as initial values, respectively, in the certain block, when the rewriting target block is switched.

In this structure, attention is focused on that a frequency is incremented by one each time an operating frequency or a failure diagnosis frequency is rewritten. Namely, a counter value of the operating frequency or the failure diagnosis frequency can be recognized as a rewriting frequency in a corresponding block of the non-volatile memory. When the operating frequency or the failure diagnosis frequency reaches the overflow threshold, a rewriting target block is switched to another block. This enables an additional memory area dedicated for storing the rewriting frequency in the corresponding block to be eliminated, which results in efficiently using the non-volatile memory. Furthermore, according to Rate Base Monitor Method in OBD II, for preventing data loss due to overflow of the operating frequency or the failure diagnosis frequency, it is specified that the operating frequency and the failure diagnosis frequency are halved when the operating frequency or the failure diagnosis frequency reaches the overflow threshold of $65535\pm2$. The overflow threshold is $65535\pm2$ and less than a usual operation guarantee frequency of the non-volatile memory. The overflow threshold can be thereby used for determining whether the rewriting frequency of the non-volatile memory is less than the operation guarantee frequency. This eliminates computation processing necessary only for determining whether the rewriting frequency of the non-volatile memory is less than the operation guarantee frequency, which results in enhancing efficiency of the computation processing.

In another aspect of the present invention, when the rewriting target block is switched from the given block to the certain block, values of zero are stored as initial values in the certain block. In this structure, the frequency information is incremented from zero in a new rewriting target block, i.e., the certain block. Memory capacity in the new rewriting target block can be thereby more efficiently used in comparison with a case where the initial vales in the certain block are halves of the frequency information in a former rewriting target block, i.e., the given block.

BRIEF DESCRIPTION OF THE DRAWINGS

The above and other objects, features, and advantages of the present invention will become more apparent from the following detailed description made with reference to the accompanying drawings. In the drawings:

FIGS. 5A to 5C are schematic diagrams explaining an instance that a rewriting target block is switched from Block 1 to Block 2 when an operation frequency (denominator) reaches an overflow threshold according to the first embodiment;

FIGS. 6A to 6B are schematic diagrams explaining an instance that a rewriting target block is switched from Block 2 to Block 3 when a failure diagnosis frequency (numerator) reaches an overflow threshold according to the first embodiment;

FIGS. 12A to 12C are diagrams explaining an instance of outputting failure diagnosis frequency and operating frequency according to the third embodiment;

FIGS. 13A to 13C are diagrams explaining another instance of outputting failure diagnosis frequency and operating frequency according to the third embodiment.

DETAILED DESCRIPTION OF THE PREFERRED EMBODIMENTS (First Embodiment)

A vehicle control system according to a first embodiment of the present invention will be explained based on drawings. In this embodiment, the vehicle control system is applied to an engine control system that controls an engine mounted in a vehicle. However, it can be also applied to a transmission control system, a brake control system, or the like.

Figure 1:
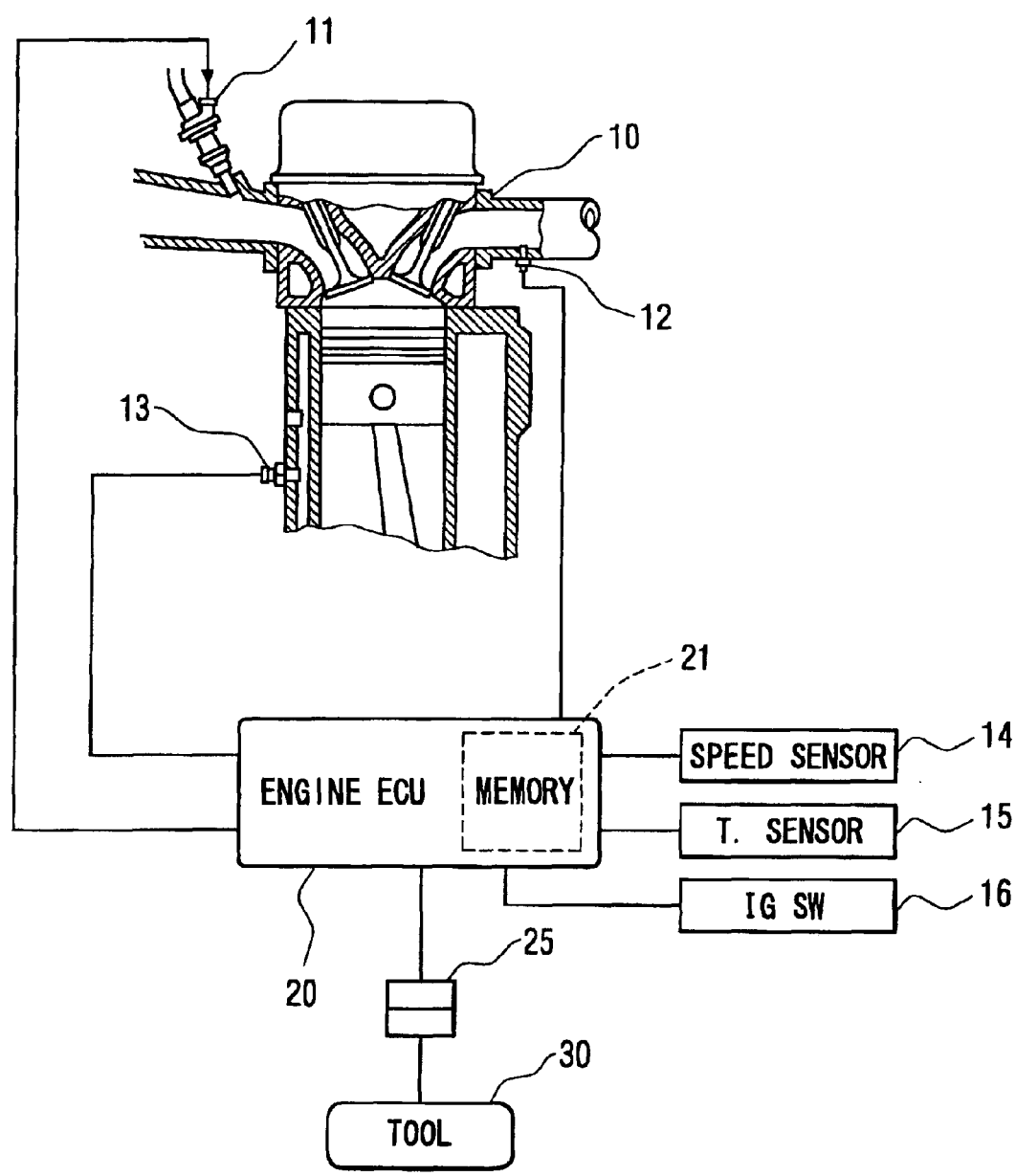
FIG. 1 is a schematic diagram of structure of an engine control system as a vehicle control system according to a first embodiment of the present invention.

FIG. 1 is a schematic diagram of structure of an engine control system according to the first embodiment. A suction pipe of an engine 10 is equipped with an injector 11 for injecting a fuel pressure-filled by a fuel pump (not shown). A fuel amount or injection timing is controlled by an engine ECU (Electronic Control Unit) 20.

An exhaust pipe of the engine 10 is equipped with an $O_2$ sensor 12, which detects an oxygen concentration in the exhaust pipe to output it to the engine ECU 20. The engine ECU 20 controls air-fuel ratio that is ratio of an air amount relative to a fuel amount. Here, the air and the fuel are sent to the engine 10.

A cylinder block of the engine 10 is equipped with a water temperature sensor 13 for detecting temperature of cooling water for the engine 10. Furthermore, the engine control system of the embodiment includes a speed sensor 14, an outside air temperature sensor 15, and an ignition switch (IG SW) sensor 16, each of which is connected with the engine ECU 20 to output detection signals or the like to the engine ECU 20. Additionally, the engine ECU 20 receives signals from an air flow meter for detecting an amount of a suction air to the engine 10, a throttle position sensor for detecting an opening degree of a throttle valve, a secondary $O_2$ sensor provided downstream of a catalyst within the exhaust pipe, and the like, all of which are not shown.

The engine ECU 20 constructed as a common computer includes known CPU, ROM, RAM, I/O, and a bus line connecting the preceding components. The ROM is stored with a program that the engine ECU 20 executes. According to the program, the CPU executes a given computation to control a combustion state in the engine 10.

Figures 2, 4:
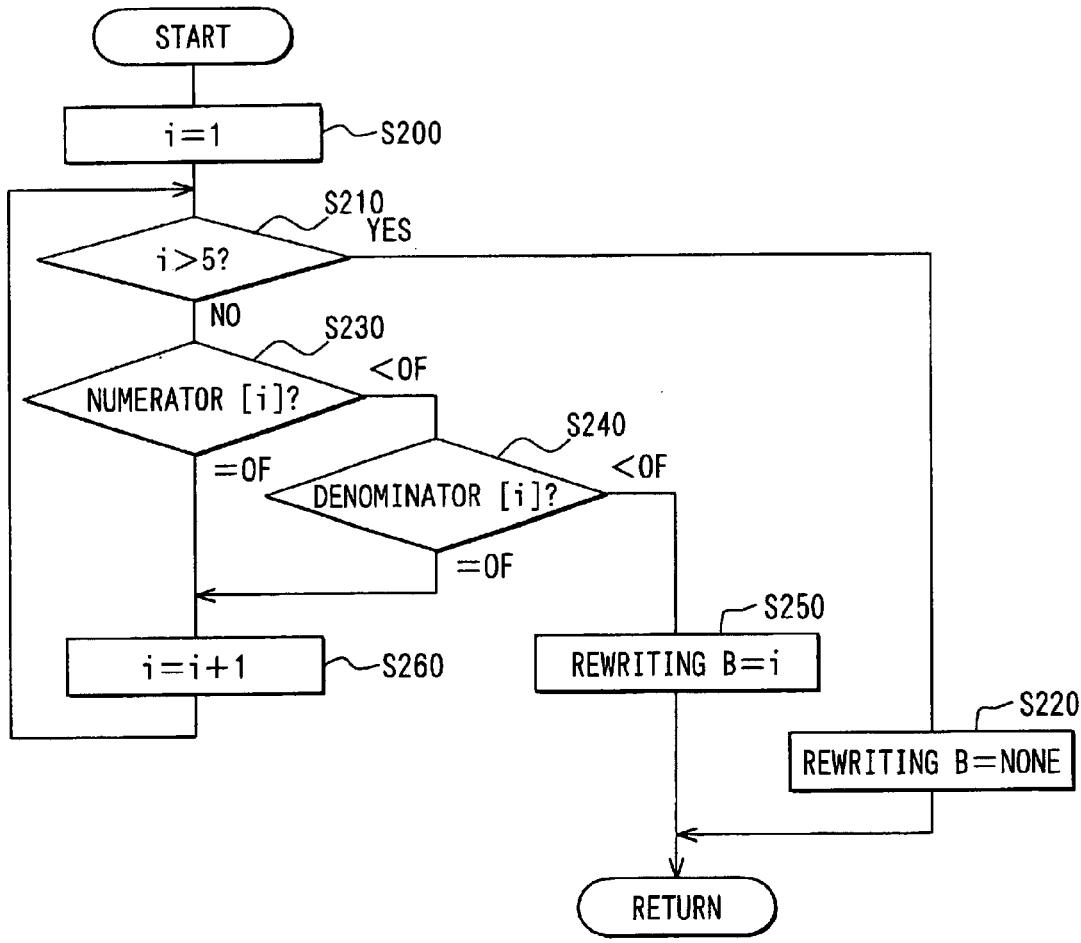
FIG. 2 is a schematic diagram showing a state where a non-volatile memory is divided into plural blocks according to the first embodiment.
FIG. 4 is a flowchart diagram of a search routine for searching for a present rewriting target block according to the first embodiment.

The engine ECU 20 furthermore includes a non-volatile memory 21 formed of an EEPROM or the like. The non-volatile memory 21 is stored with a failure diagnosis frequency and an operating frequency. The failure diagnosis frequency is the number of times the engine ECU 20 conducts a failure diagnosis on a component such as an $O_2$ sensor, a catalyst, a fuel evaporator, and the like, all of which especially affect composition of an exhaust gas. The operating frequency is the number of times the vehicle enters a given operating state. In detail, as shown in FIG. 2, a storing area is provided for each diagnosis target component, and the storing area is divided into five blocks (B1 to B5), each of which has two columns for storing the failure diagnosis frequency and the operating frequency. Each of the columns has a two-byte memory volume.

Here, when a rewriting frequency, namely the failure diagnosis frequency or the operating frequency, in a certain block B1 to B5 being a rewriting target block reaches an overflow threshold of $65535 \pm 2 (=(2^{16}-1) \pm 2)$, the rewriting target block is switched from the certain block B1 to B5 into another block B1 to B5. Thus, for preventing overflow of the failure diagnosis frequency and the operating frequency, the rewriting target block is switched between the blocks B1 to B5 of the non-volatile memory 21. As a result, as specified in Rate Base Monitor Method of OBD II, a monitor frequency ratio that is computed by defining the failure diagnosis frequency and operating frequency as a numerator and denominator, respectively, can be always confirmed.

The engine ECU 20 is also connected with a tool 30 through a diagnosing connector 25. According to an output request regarding failure diagnosis by the tool 30, the engine ECU 20 outputs data corresponding to the request. For instance, when an output is requested for information relating to an execution frequency ratio of the failure diagnosis, the engine ECU 20 outputs the failure diagnosis frequency and operating frequency.

Figure 3:
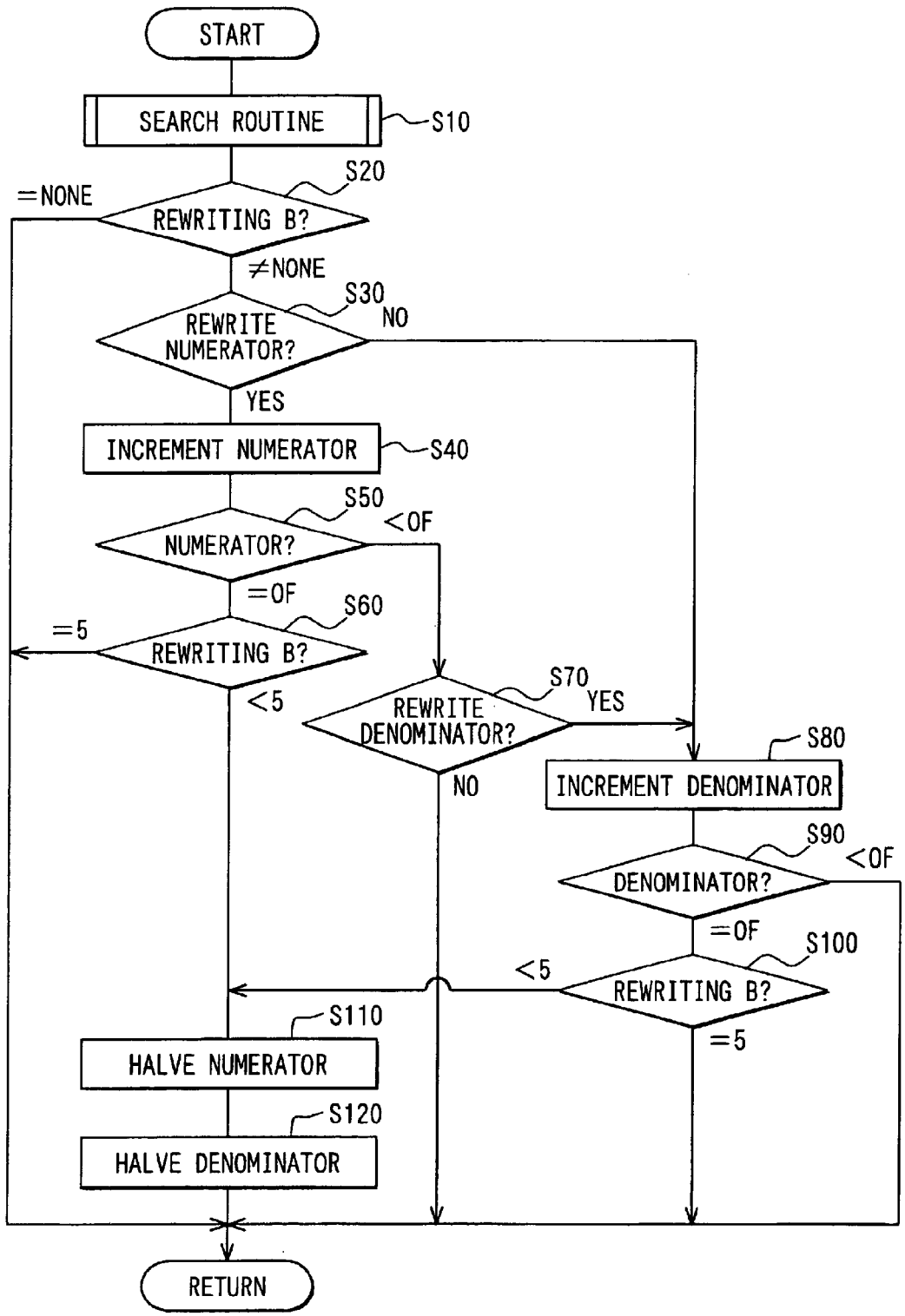
FIG. 3 is a flowchart diagram of processing of rewriting of a failure diagnosis frequency and operating frequency in a non-volatile memory according to the first embodiment.

In the next place, FIG. 3 is a flowchart diagram of processing of rewriting, in the non-volatile memory 21, of a failure diagnosis frequency and operating frequency and accompanying processing of switching of a rewriting target block. FIG. 4 is a flowchart diagram of a search routine for searching for a present rewriting target block.

Here, the processing shown in FIGS. 3, 4 are executed when it is detected that the vehicle enters a given operating state or when the failure diagnosis is executed.

The given operating state of the vehicle includes, for instance, a state where an ignition switch is turned on and an engine 10 is started. Furthermore, it can include a combination of the following: a state where it has passed a preset period since the engine is started; a state where a vehicle speed has continued to be more than a preset speed for more than a preset period; a state where operation in an idling rotation has continued more than a preset period; and a state where outdoor air temperature is more than a preset temperature. Detecting the preceding states uses detection signals from the water temperature sensor 13, speed sensor 14, outside air temperature sensor 15, IG switch 16 shown in FIG. 1.

By contrast, the failure diagnosis is executed by investigating an item such as whether output voltage for the $O_2$ sensor is within a normal range. Here, the output voltage of the $O_2$ sensor is outside the normal range when temperature of the engine 10 is low or during the transition period when rotation speed of the vehicle is changing through accelerating or decelerating the vehicle. Therefore the failure diagnosis is executed when a condition suitable for the investigated item is effected.

The processing shown in FIGS. 3, 4 can be started as soon as the given operating state is detected or the failure diagnosis is executed. By contrast, it can be started otherwise. Namely, it is designed that a history of detection of the given operating state or of execution of the failure diagnosis is once stored, and it is determined whether the stored history is present or not at preset time intervals. When the history is present, the processing shown in FIGS. 3, 4 is started. Here, as soon as the given operating state is detected, data indicating detection of the given operating state is stored in a backup RAM of the engine ECU 20. Likewise, as soon as the failure diagnosis is executed, data indicating execution of the failure diagnosis is stored in the backup RAM of the engine ECU 20. At preset time intervals (every 4 seconds), the contents of the data stored in the backup RAM are determined. Based on the determined data, the failure diagnosis frequency or the operating frequency stored in the non-volatile memory 21 is rewritten. Instead of preset time intervals, the above determination can be executed in a cycle from an engine start to an engine stop.

In the rewriting processing, when the data indicating detection of the given operating state is stored in the backup RAM, the operating frequency is increased by one time. When the data indicating execution of the failure diagnosis is stored in the backup RAM, the failure diagnosis frequency is increased by one time. When effecting a condition where the failure diagnosis is executed is less frequent than effecting a condition where the given operating state is detected, the operating frequent becomes greater than the failure diagnosis frequency. Reaching the overflow threshold can be therefore determined by the operating frequency alone.

Here, providing the engine ECU 20 with a self-shut relay enables the engine ECU 20 to be powered while the engine ECU 20 executes necessary processing even after the ignition switch is turned off. Thereafter, the engine ECU 20 cuts power supply to itself by opening the self-shut relay circuit.

The flowchart diagrams in FIGS. 3, 4 will be explained below. At Step 10 in FIG. 3, a search routine is executed for searching for a present rewriting target block that is one of the blocks B1 to B5 in the non-volatile memory 21. The present rewriting block includes the failure diagnosis frequency and the operating frequency, both of which are presently being counted. The search routine is shown in FIG. 4 in detail.

At step 200 in FIG. 4, Variation i indicating a rewriting target block is set to one as an initial value. In this embodiment, each time the stored failure diagnosis frequency or operating frequency reaches an overflow threshold, the rewriting target block is serially switched from a low-numbered block to a high-numbered block, namely from the block B1 towards the block B5.

At Step 210, it is determined whether Variation i is more than five. Being more than five is effected when all blocks B1 to B5 were rewriting target blocks and the failure diagnosis frequency or the operating frequency in the block B5 also reaches the overflow threshold. This will be explained later in detail. When this condition is effected, there is no present rewriting target block. The processing thereby proceeds to Step 220, where "rewriting block=none" is set. By contrast, when Variation i is determined not more than five in a case where the processing at Step 210 is executed for the first time after the search routine is started or in other cases, the processing proceeds to Step 230.

At Step 230, it is determined whether a failure diagnosis frequency (numerator [i]) in Block i indicated by Variation i is equal to or less than an overflow threshold (OF, 65535±2). When the failure diagnosis frequency is determined to reach the overflow threshold, the processing proceeds to Step 260. By contrast, when the failure diagnosis frequency is determined not to reach the overflow threshold, the processing proceeds to Step 240.

At Step 240, it is determined whether an operating frequency (denominator [i]) in Block i indicated by Variation i is equal to or less than the overflow threshold (OF, 6553±2). When the operating frequency is determined to reach the overflow threshold, the processing proceeds to Step 260. By contrast, when the operating frequency is determined not to reach the overflow threshold, the processing proceeds to Step 250.

At Step 250, neither the failure diagnosis frequency being the numerator [i] nor the operating frequency being the denominator [i] reaches the overflow threshold in Block i, so that "rewriting block 32 Block i" is set for defining Block i as a rewriting target block.

At Step 260, either the failure diagnosis frequency being the numerator [i] or the operating frequency being the denominator [i] reaches the overflow threshold in Block i, so that Variation i is incremented. Namely, the rewriting target block is switched, and the processing after Step 210 is repeated again. When this repetition leads to defining Block 5 as a rewriting block and either the failure diagnosis frequency or the operating frequency reaches the overflow threshold in Block 5, Variation i is incremented for Variation i to become six at Step 260. At subsequent processing of Step 210, as explained above, Variation i is determined to be more than five.

Through executing the above search routine, the rewriting target block is set, so that the rewriting target block set in the search routine is selected at Step 20 in FIG. 3. Here, when "rewriting block=none" is set in the search routine in FIG. 4, the processing is terminated. By contrast, when any block B1 to B5 is selected as the rewriting target block, it is determined at Step 30 whether a failure diagnosis frequency being a numerator is rewritten. The flowchart is executed when at least either the failure diagnosis frequency or operating frequency is to be rewritten. Therefore, at Step 30, it is determined whether the failure diagnosis frequency being a numerator is to be rewritten or not.

When it is determined at Step 30 that the failure diagnosis frequency (numerator) is to be rewritten, the processing proceeds to Step 40. Otherwise, the processing proceeds to Step 80, where the operating frequency being a denominator is rewritten.

At Step 40, a failure diagnosis frequency (numerator) stored in the rewriting target block is incremented by one to be a refreshed failure diagnosis frequency. At Step 50, it is determined whether the rewritten failure diagnosis frequency (numerator) reaches the overflow threshold. When it is determined that the rewritten failure diagnosis frequency (numerator) reaches the overflow threshold, the processing proceeds to Step 60. When it is contrarily determined that the rewritten failure diagnosis frequency (numerator) does not reach the overflow threshold, the processing proceeds to Step 70.

At Step 50, it is determined that the rewritten failure diagnosis frequency (numerator) reaches the overflow threshold, the rewriting target block must be switched for preventing the failure diagnosis frequency from disappearing due to overflow. However, when the rewriting target block is presently set in Block 5, there is no new block B1 to B5 for rewriting. At Step 60, it is therefore determined whether the rewriting target block is set in Block 5. When it is determined that the rewriting target block is set in Block 5, no new block B1 to B5 for rewriting exists and the processing of this flowchart is terminated. When it is contrarily determined that the rewriting target block is not set in Block 5, a new block B1 to B5 for rewriting exists and the processing proceeds to Step 110.

At Step 50, it is determined that the rewritten failure diagnosis frequency (numerator) does not reach the overflow threshold, continuing of rewriting the failure diagnosis frequency can be possible in the present block B1 to B5 (any one of Blocks 1 to 5). At Step 70, it is thereby determined whether an operating frequency being a denominator is needed to be also rewritten. Here, when it is determined that the operating frequency (denominator) is needed to be also rewritten, the processing proceeds to Step 80. When it is contrarily determined that the operating frequency (denominator) is not needed to be also rewritten, the processing is terminated.

At Step 80, an operating frequency (denominator) stored in the rewriting target block is incremented by one to be a refreshed operating frequency. At Step 90, it is determined whether the rewritten operating frequency (denominator) reaches the overflow threshold. When it is determined that the rewritten operating frequency (denominator) reaches the overflow threshold, the processing proceeds to Step 100. When it is contrarily determined that the rewritten operating frequency (denominator) does not reach the overflow threshold, the processing is terminated.

At Step 100, similarly with Step 60, it is determined whether the rewriting target block is presently set in Block 5. When it is determined that the rewriting target block is set in Block 5, no new block B1 to B5 for rewriting exists and the processing of this flowchart is terminated. When it is contrarily determined that the rewriting target block is not set in Block 5, a new block B1 to B5 for rewriting exists and the processing proceeds to Step 110.

At Step 110, the failure diagnosis frequency (numerator) in the present rewriting target block is halved to be written in a new rewriting target block located in a block B2 to B5 having the number increased by one. At Step 120, the operating frequency (denominator) in the present rewriting target block is halved to be written in the new rewriting target block located in the block B2 to B5 having the number increased by one. This thereby enables the failure diagnosis frequency and the operating frequency to be retained without overflowing.

Here, in the above writing processing at Steps 110, 120, the failure diagnosis frequency and operating frequency in the present rewriting target block are retained without being changed. As explained at Steps 230, 240 in FIG. 4, comparing the failure diagnosis frequency or operating frequency with the overflow threshold thereby enables determination of which block B1 to B5 the present rewriting target block is, without using a dedicated pointer.

Switching a rewriting target block from Block 1 to Block 2 will be explained as an instance with reference to FIGS. 5A to 5C.

In FIG. 5A, a failure diagnosis frequency (numerator) has a value of 49152 (C000=$12 \times 16^3 + 0 \times 16^2 + 0 \times 16^1 + 0 \times 16^0$), so that it still affords room for rewriting. By contrast, an operating frequency has a value of 65533 (FFFD=$15 \times 16^3 + 15 \times 16^2 + 15 \times 16^1 + 13 \times 16^0$), so that difference from the overflow threshold (65534) is only one.

As shown in FIG. 5B, when the operating frequency (denominator) is incremented by one at Step 80 in FIG. 3, the operating frequency (denominator) reaches the overflow threshold. In this case, as shown in FIG. 5C, through the processing at Steps 110, 120, the failure diagnosis frequency (numerator) and the operating frequency (denominator) in Block 1 of the present rewriting block are read out to be halved and written (stored) in Block 2 of the new rewriting target block.

Here, when the operating frequency (denominator) reaches the overflow threshold, both the failure diagnosis frequency (numerator) and the operating frequency (denominator) are halved to be written in Block 2. This is because both the failure diagnosis frequency and the operating frequency must be simultaneously halved when a frequency ratio for failure diagnosis is computed. This is also because the rewriting frequency in the failure diagnosis frequency column of Block 1 becomes unequal to the halved failure diagnosis frequency if the halved failure diagnosis frequency is rewritten in Block 1.

FIGS. 6A to 6B show an instance that a rewriting target block is switched from Block 2 to Block 3 when the failure diagnosis (numerator) reaches the overflow threshold. Namely, even when the failure diagnosis frequency (numerator), instead of the operating frequency, reaches the overflow threshold, the failure diagnosis frequency (numerator) and the operating frequency (denominator) are halved and written in Block 3 of the new rewriting target block.

However, as explained in the above, there is a case where rewriting is executed in a cycle from an engine start to an engine stop. Here, when effecting a condition where the failure diagnosis is executed is less frequent than effecting a condition where the given operating state is detected, the operating frequent becomes always greater than the failure diagnosis frequency. Reaching the overflow threshold can be therefore determined by the operating frequency alone.

Furthermore, in this case, in the search routine in FIG. 4, only determining whether the operating frequency (denominator) reaches the overflow threshold can be used for designating the present rewriting target block.

As explained above, in the vehicle control system of the embodiment, values of the failure diagnosis frequency and operating frequency are correlated with rewriting frequencies in the respective blocks B1 to B5 in the non-volatile memory 21. When the failure diagnosis frequency or operating frequency reaches the overflow threshold (65535±2), the rewriting target block where the failure diagnosis frequency and operating frequency are being rewritten is switched to another block B2 to B5. This structure eliminates a dedicated memory area for storing a result from a counter for counting a rewriting frequency in each block B1 to B5, so that the non-volatile memory 21 is effectively used. Furthermore, the overflow threshold is used for determining whether a rewriting frequency in each block B1 to B5 reaches the operation guarantee frequency. No additional comparison computation is needed to be provided only for determining whether a rewriting frequency reaches the operation guarantee frequency. This also results in promoting the efficiency of computation processing.

(Second Embodiment)

A vehicle control system according to a second embodiment has the same structure as the first embodiment, so that explanation will be eliminated below.

In the first embodiment, even after a rewriting target block is switched, a stored frequency in a block B1 to B5 being formerly a rewriting target block prior to switching is retained. A present rewriting target block is thereby designated through determining whether a stored frequency in each block B1 to B5 reaches an overflow threshold. By contrast, in the second embodiment, when the rewriting target block is switched, the stored frequency in the block B1 to B5 being formerly the rewriting target block prior to switching is rewritten to a determination value indicating that the block B1 to B5 is a used block. This structure also enables determination of whether a block B1 to B5 is a used one, a present rewriting target block, or the like, based on the determination value.

Figure 7:
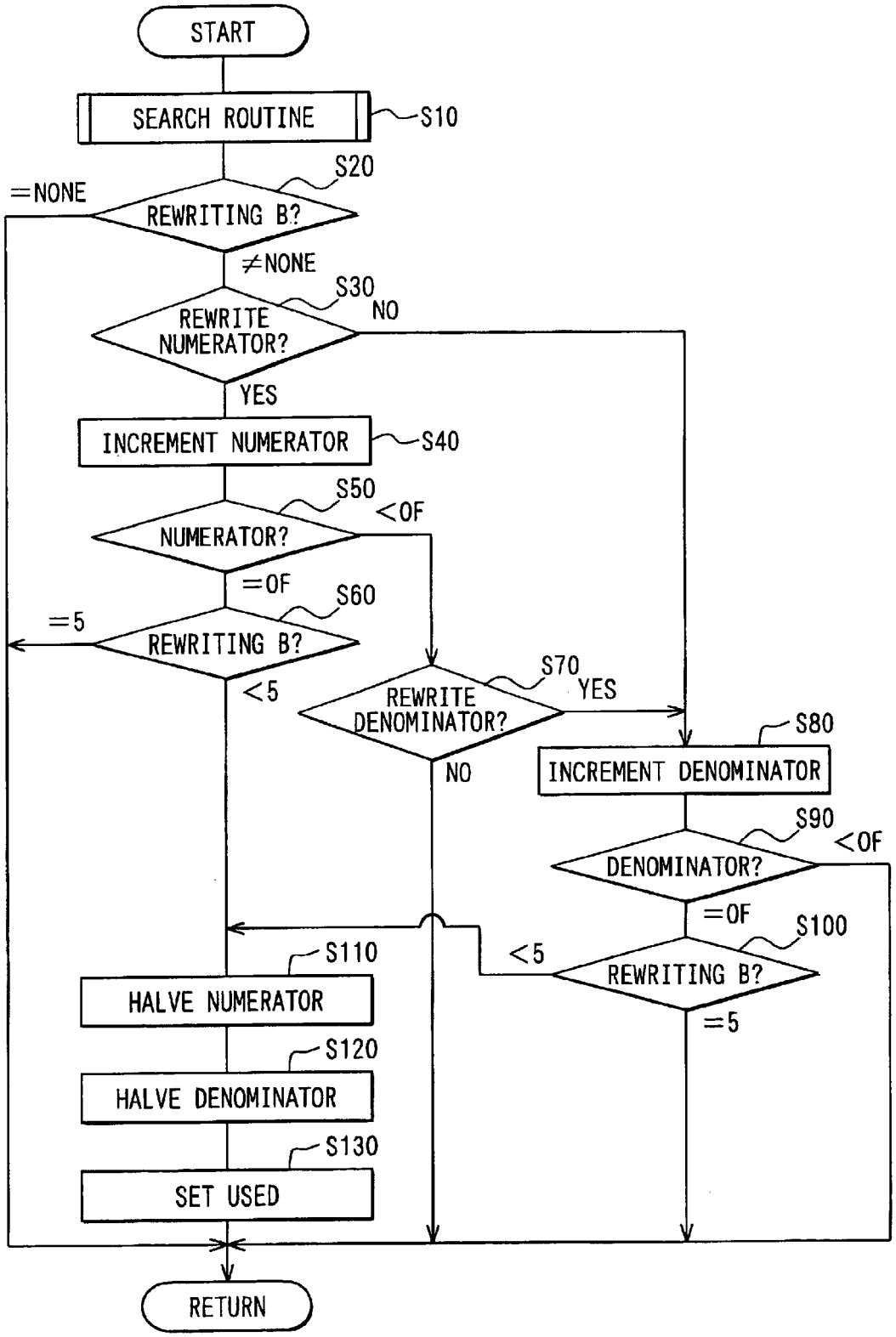
FIG. 7 is a flowchart diagram of processing of rewriting of a failure diagnosis frequency and operating frequency in a non-volatile memory according to a second embodiment.

FIG. 7 is a flowchart diagram of processing of rewriting in a non-volatile memory 21 according to the second embodiment. As shown in FIG. 7, processing from Step 10 to Step 120 is the same as in the first embodiment shown in FIG. 3.

In this embodiment, processing executes the following: a failure diagnosis frequency or an operating frequency reaches the overflow threshold; a rewriting target block is switched; stored frequencies in the block B1 to B5 being formerly the rewriting target block prior to switching are halved to be written in a new block B2 to B5 (at Step 120); and a used determination value indicating that the block B1 to B5 is a used block is written only in the failure diagnosis frequency column of the block B1 to B5 being formerly the rewriting target block (at Step 130).

As the used determination value, a value of 65535 being greater than the overflow threshold of 65534 is adopted. This is because the used determination value is needed to be differentiated from a value between zero and the overflow threshold used for a failure diagnosis frequency. Thus, each time the rewriting target block is switched, the used determination value is written only in the failure diagnosis frequency column of the block B1 to B5 being formerly the rewriting target block prior to switching. This structure enables the present (newest) rewriting target block to be searched for by determining only whether the failure diagnosis frequency column of a block B1 to B5 includes the used determination value. This results in simplifying the search processing for the present rewriting target block.

Figures 8, 9:
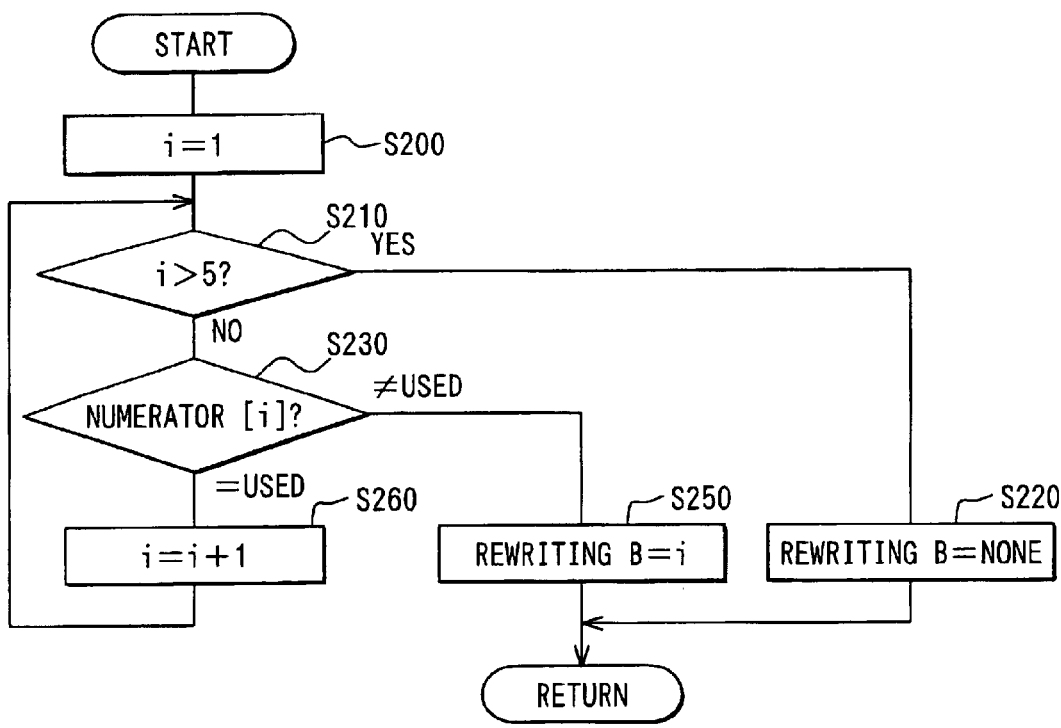
FIG. 8 is a flowchart diagram of a search routine for searching for a present rewriting target block according to the second embodiment.
FIG. 9 is a schematic diagram explaining a used determination value according to the second embodiment.

FIG. 8 is a flowchart diagram of a search routine for searching for a present rewriting target block according to the second embodiment. As shown in FIG. 8, it is determined at Step 230 only whether the failure diagnosis frequency (numerator) is equal to the used determination value. No determination is executed regarding the operating frequency (denominator). When it is determined at Step 230 that the failure diagnosis frequency (numerator) is equal to the used determination value, the processing proceeds to Step 260. When it is contrarily determined that the failure diagnosis frequency (numerator) is not equal to the used determination value, the processing proceeds to Step 250.

At Step 250, since the used determination value is not stored in the failure diagnosis frequency column of Block i indicated by Variation i, "rewriting block=i" is set for defining Block i as the rewriting target block. At Step 260, since the used determination value is stored in the failure diagnosis frequency column of Block i indicated by Variation i, Variation i is incremented by one and thereafter the processing from Step 210 is repeated. Thus, the present rewriting target block can be searched for through only determining the stored value in the failure diagnosis frequency column of the block B1 to B5. This structure simplifies the search processing in comparison with that of the first embodiment.

In the above, the used determination value is written in the failure diagnosis frequency column. However, the used determination value can be instead written in the operating frequency column, so that the rewriting target block can be searched based on the value in the operating frequency column. Furthermore, even though no effect of simplifying can be obtained, the following can be adopted. Here, the used determination value is written in a column for failure diagnosis frequency or operating frequency reaching the overflow threshold. Thereafter, like the first embodiment, the rewriting target block can be searched for based on determination of whether the value in the column is equal to the used determination value.

(Third Embodiment)

A vehicle control system according to a third embodiment also has the same structure as the first embodiment, so that explanation will be eliminated below.

In the first embodiment, when a failure diagnosis frequency or operating frequency reaches the overflow threshold, a rewriting target block is switched and stored frequencies are halved to be written as initial values in a block B1 to B5 being newly a rewriting target block posterior to switching. Consequently, a rewriting frequency that is the number of times memory is practically to be rewritten in the second and yet subsequent blocks B2 to B5 is reduced by the initial value. By contrast, in the third embodiment, values of zero are previously set as initial values in the new rewriting target block, and the failure diagnosis frequency and operating frequency are thereby incremented from the values of zero. This structure enables the blocks to be effectively used.

Figure 10:
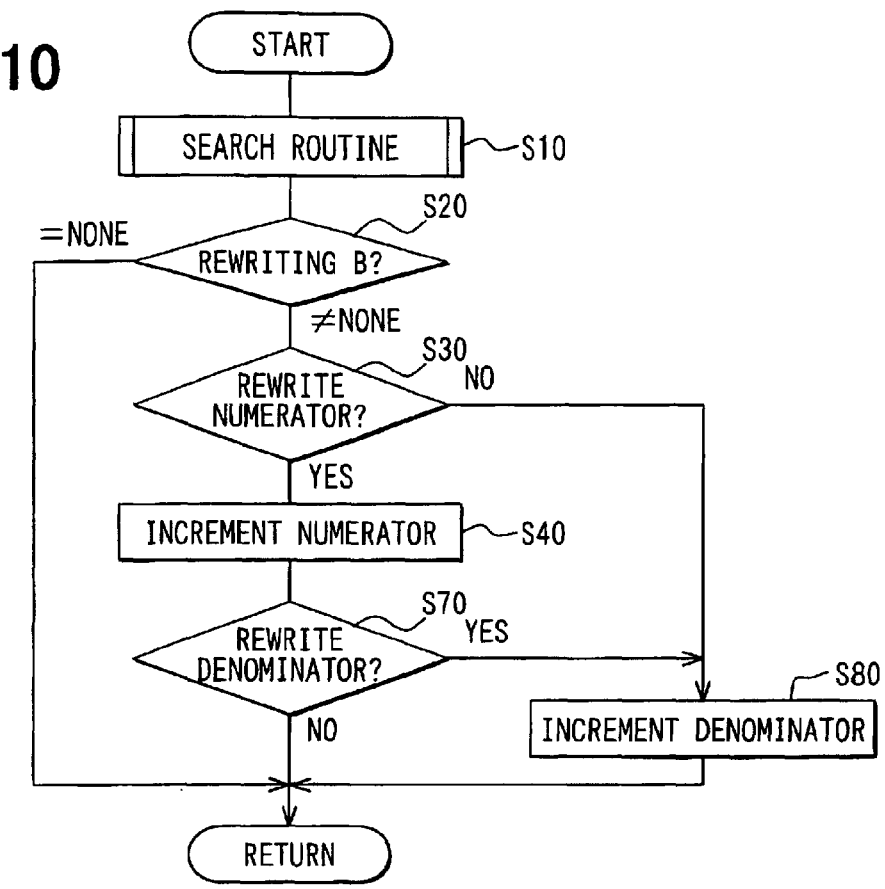
FIG. 10 is a flowchart diagram of processing of rewriting of a failure diagnosis frequency and operating frequency in a non-volatile memory according to a third embodiment.

FIG. 10 is a flowchart diagram of processing of rewriting in a non-volatile memory 21 according to the third embodiment. As shown in FIG. 10, after the processing at Step 10 in FIG. 4 searches for a rewriting target block to set either "rewriting block=i" or "rewriting block=none," the processing proceeds to Step 20. At Step 20, it is determined whether a rewriting target block exists. When it is determined that the rewriting target block exists, the processing proceeds to Step 30. Here, it is determined whether the failure diagnosis frequency being a numerator is to be rewritten. The flowchart is executed when at least either the failure diagnosis frequency or operating frequency is to be rewritten. Therefore, at Step 30, it is determined whether the failure diagnosis frequency being a numerator is to be rewritten or not.

When it is determined at Step 30 that the failure diagnosis frequency (numerator) is to be rewritten, the processing proceeds to Step 40. Otherwise, the processing proceeds to Step 80, where the operating frequency being a denominator is rewritten. At Step 40, a failure diagnosis frequency (numerator) stored in the rewriting target block is incremented by one to be a refreshed failure diagnosis frequency. At Step 70, it is determined whether an operating frequency being a denominator is needed to be also rewritten. Here, when it is determined that the operating frequency (denominator) is needed to be also rewritten, the processing proceeds to Step 80. When it is contrarily determined that the operating frequency (denominator) is not needed to be rewritten, the processing is terminated. At Step 80, an operating frequency (denominator) stored in the rewriting target block is incremented by one, and the processing of the flowchart is then terminated.

Thus, in this embodiment, unlike the first embodiment, there is no need of halving the stored frequencies to write in the new rewriting target block after the failure diagnosis frequency or the operating frequency reaches the overflow threshold. This results in remarkably simplifying rewriting processing for the failure diagnosis frequency and operating frequency.

However, when zero is set as an initial value in a block B2 to B5 being newly the rewriting block posterior to switching, there is no relation, unlike the first embodiment, between the stored frequency in the block B1 to B4 being formally the rewriting target block and the stored frequency in the block B2 to B5 being newly the rewriting target block. When an output for the execution frequency ratio of the failure diagnosis is requested, outputting the frequencies in the present (newest) rewriting target block is not sufficient. It is necessary to output not only the frequencies in the block B1 to B5 being presently the rewriting target block (i.e., present rewriting target block) but also the frequencies in the block (s) B1 to B4 being formally the rewriting target block (i.e., former rewriting block). However, when these frequencies are summed and outputted, correct output may not be realized due to the overflow.

Figure 11:
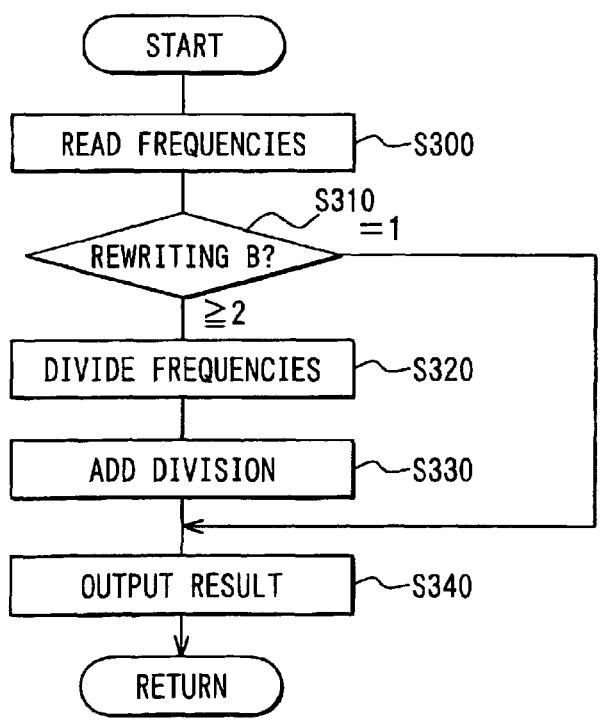
FIG. 11 is a flowchart diagram of processing of outputting a failure diagnosis frequency and operating frequency according to the third embodiment.

When an output for failure diagnosis is requested from the tool 30, the engine ECU 20 executes processing shown in FIG. 11 to output the failure diagnosis frequency and operating frequency in the non-volatile memory 21. At first, at Step 300, reads out all failure diagnosis frequencies and operating frequencies stored in the non-volatile memory 21.

At Step 310, based on the read failure diagnosis frequencies and operating frequencies, it is determined whether the present rewriting target block is Block 1, Block 2, or another. When it is determined that the present rewriting target block is Block 1, the processing proceeds to Step 340, where the failure diagnosis frequency and operating frequency in Block 1 are directly outputted.

By contrast, when it is determined that the present rewriting target block is other than Block 1, the processing proceeds to Step 320. Here, the stored frequencies are divided by given values, respectively, for preventing overflowing of the sum of stored values in the present rewriting target block and former rewriting target block(s). At Step 330, division results of the respective stored frequencies are summed up to obtain failure diagnosis frequency and operating frequency for computing the execution frequency ratio of failure diagnosis. At Step 340, the obtained failure diagnosis frequency and operating frequency are then outputted.

For instance, in FIGS. 12A to 12C, as an operating frequency reaches the overflow threshold in Block 1, a rewriting target block is switched from Block 1 to Block 2 and an operating frequency is incremented and rewritten to one from an initial value. Here, when an output for an execution frequency ratio of failure diagnosis is requested, stored frequencies in Block 1 are divided by two. On the other hand, stored frequencies in Block 2 are divided by one till either failure diagnosis frequency or operating frequency reaches half of the overflow threshold. The above division results are summed up to obtain a failure diagnosis frequency and operating frequency. Here, the failure diagnosis frequency is 6000 (=C000/2+0000 (in hexadecimal form)), while the operating frequency is 8000 (=FFFE/2+0001).

However, after either failure diagnosis frequency or operating frequency reaches half of the overflow threshold, direct addition of the stored frequencies in Block 2 to the halved frequencies in Block 1 may exceed the overflow threshold. In this case, the frequencies in Block 2 can be divided by two or a divisor for dividing the frequencies in Block 1 is increased. The sum of the division results is thereby prevented from overflowing.

In FIGS. 13A to 13C, another instance is shown. As an operating frequency (denominator) reaches the overflow threshold in Block 1, a rewriting target block is switched from Block 1 to Block 2. Thereafter, as a failure diagnosis frequency reaches the overflow threshold, a rewriting target block is switched from Block 2 to Block 3. In Block 3, a failure diagnosis frequency is incremented to one from an initial value. Here, since the frequencies in three blocks B1 to B3 are summed, a divisor for division processing must be increased much more.

For instance, when an output for an execution frequency ratio is requested from the tool 30, the frequencies in Block 1 are divided by four and the frequencies in Block 2 are divided by two. The frequencies in Block 3 are divided by one till either failure diagnosis frequency or operating frequency reaches one fourth of the overflow threshold. The above division results are summed up to obtain a failure diagnosis frequency and operating frequency. Here, the failure diagnosis frequency is B000(=C000/4+FFFE/2+0001), while the operating frequency is B7FF(=FFFE/4+F000/2+0000).

However, after either failure diagnosis frequency or operating frequency reaches one fourth of the overflow threshold, direct addition of the stored frequencies in Blocks 3 may exceed the overflow threshold. In this case, the frequencies in at least one block of the three blocks B1 to B3 must be divided by an increased divisor. The sum of the division results is thereby prevented from exceeding the overflowing threshold.

(Modification)

Up to here, favorable embodiments are explained. However, the present invention is not limited to the above embodiments and can be implemented with modifications as long as the main points of the invention are maintained.

For instance, in a non-volatile memory 21, five blocks are provided for storing a failure diagnosis frequency and an operating frequency. However, the number of the blocks is not limited to five.

In particular, when each block is designed to have a value from zero to the overflow threshold as in the third embodiment, two-block structure is sufficiently practical for a rewriting frequency of a failure diagnosis frequency or an operating frequency in a usual use of a vehicle. Thus, when the two-block structure storing the failure diagnosis frequency and operating frequency is provided, the failure diagnosis frequency and operating frequency can be computed by the method shown in FIGS. 12A to 12C.

It will be obvious to those skilled in the art that various changes may be made in the above-described embodiments of the present invention. However, the scope of the present invention should be determined by the following claims.

What is claimed is:

1. A control system that is provided in a vehicle and controls an in-vehicle device, the control system comprising:
   detecting means for detecting that the vehicle enters an operating state;
   diagnosing means for executing a failure diagnosis on a diagnosis target when a given condition is effected;
   a non-volatile memory where stored information is electrically rewritable, wherein the non-volatile memory includes a plurality of blocks, each of which can be stored with frequency information including an operating frequency that is a number of times the vehicle enters the operating state and a failure diagnosis frequency that is a number of times the failure diagnosis is executed;
   outputting means for outputting execution information relating to the frequency information when it is externally requested that information regarding an execution frequency ratio of the failure diagnosis be outputted;
   rewriting means for rewriting the frequency information included in a rewriting target block of the blocks, wherein an operating frequency included in the rewriting target block is increased when it is detected that the vehicle enters the operating state while a failure diagnosis frequency in the rewriting target block is increased when the failure diagnosis is executed; and
   switching means for switching the rewriting target block from a given block of the blocks to a certain block of the blocks, when at least one of a given operating frequency and a given failure diagnosis frequency in the given block reaches an overflow threshold,
   wherein the rewriting means writes, as initial values, half of the given operating frequency and half of the given failure diagnosis frequency in the certain block, respectively, when the switching means switches the rewriting target block.

2. The control system according to claim 1,
   wherein the control system includes an engine control system that controls an engine of the vehicle, while the diagnosis target includes a component that affects composition of an exhaust gas of the engine.

3. The control system according to claim 1,
   wherein, when the switching means switches the rewriting target block from the given block to the certain block, the rewriting means retains the given operating frequency and the given failure diagnosis frequency in the given block, respectively.

4. The control system according to claim 1,
   wherein, when effecting the given condition is less frequent than effecting a certain condition where the vehicle enters the operating state and the failure diagnosis frequency does not exceeds the operating frequency, the given operating frequency is only used for determining whether the overflow threshold is reached, and
   wherein, when the given operating frequency reaches the overflow threshold, the switching means switches the rewriting target block from the given block to the certain block.

5. The control system according to claim 4,
   wherein the rewriting means designates the rewriting target block based on the operating frequencies stored in the blocks.

6. The control system according to claim 1,
   wherein, when the switching means switches the rewriting target block, the rewriting means writes switching information in the given block, wherein the switching information indicates that the given block having the switching information has been used as the rewriting target block till the switching means switches the rewriting target block.

7. The control system according to claim 6,
   wherein the switching information is written as being substituted for one of the given operating frequency and the given failure diagnosis frequency in the given block.

8. The control system according to claim 6,
   wherein the switching information is a value that is greater than the overflow threshold.

9. A control system that is provided in a vehicle and controls an in-vehicle device, the control system comprising:
   detecting means for detecting that the vehicle enters an operating state;
   diagnosing means for executing a failure diagnosis on a diagnosis target when a given condition is effected;
   a non-volatile memory where stored information is electrically rewritable, wherein the non-volatile memory includes a plurality of blocks, each of which can be stored with frequency information including an operating frequency that is a number of times the vehicle enters the operating state and a failure diagnosis frequency that is a number of times the failure diagnosis is executed;
   outputting means for outputting execution information relating to the frequency information when it is externally requested that information regarding an execution frequency ratio of the failure diagnosis be outputted;
   rewriting means for rewriting the frequency information included in a rewriting target block of the blocks, wherein an operating frequency included in the rewriting target block is increased when it is detected that the vehicle enters the operating state while a failure diagnosis frequency in the rewriting target block is increased when the failure diagnosis is executed; and
   switching means for switching the rewriting target block from a given block of the blocks to a certain block of the blocks, when at least one of a given operating frequency and a given failure diagnosis frequency in the given block reaches an overflow threshold,
   wherein, when the switching means switches the rewriting target block, values of zero are stored as initial values in the certain block.

10. The control system according to claim 9,
    wherein the control system includes an engine control system that controls an engine of the vehicle, while the diagnosis target includes a component that affects composition of an exhaust gas of the engine.

11. The control system according to claim 9,
    wherein, when the switching means switches the rewriting target block from the given block to the certain block, the rewriting means retains the given operating frequency and the given failure diagnosis frequency in the given block, respectively.

12. The control system according to claim 11,

Wherein, when the switching means switches the rewriting target block at least one time and it is externally requested that information regarding the execution frequency ratio of the failure diagnosis be outputted, the outputting means outputs the execution information after dividing pieces of the frequency information in the blocks by respective divisors to compute a sum of the divided pieces of the frequency information, wherein the sum is less than the overflow threshold.

13. The control system according to claim 11,

Wherein, when a number of the plurality of the blocks is two, when it is externally requested that information regarding the execution frequency ratio of the failure diagnosis be outputted, and when the switching means switches the rewriting target block one time from the given block to the certain block, the outputting means outputs the execution information after dividing the frequency information in the given block by two and the frequency information in the certain block by one to compute a sum of the divided frequency information in the given block and the divided frequency information in the certain block as long as both of present values of the operating frequency and the failure diagnosis frequency in the certain block are not more than half of the overflow threshold.

14. The control system according to claim 13,

Wherein the outputting means outputs the execution information after dividing, by two, both of the frequency information in the given block and the frequency information in the certain block to compute a sum of the divided frequency information in the given block and the divided frequency information in the certain block when at least one of the present values of the operating frequency and the failure diagnosis frequency in the certain block exceeds the half of the overflow threshold.

15. The control system according to claim 9, wherein, when effecting the given condition is less frequent than effecting a certain condition where the vehicle enters the operating state and the failure diagnosis frequency does not exceeds the operating frequency, the given operating frequency is only used for determining whether the overflow threshold is reached, and wherein, when the given operating frequency reaches the overflow threshold, the switching means switches the rewriting target block from the given block to the certain block.

16. The control system according to claim 15, wherein the rewriting means designates the rewriting target block based on the operating frequencies stored in the blocks.

* * * * *